(12) United States Patent
Corning (10) Patent No.: US 9,908,554 B2
(45) Date of Patent: Mar. 6, 2018

(54) SNOW CAPABLE RECREATIONAL PLATFORM

(71) Applicant: Casey Corning, Beaverton, OR (US)

(72) Inventor: Casey Corning, Beaverton, OR (US)

( * ) Notice: Subject to any disclaimer, the term of this patent is extended or adjusted under 35 U.S.C. 154(b) by 0 days.

(21) Appl. No.: 15/046,326

(22) Filed: Feb. 17, 2016

(65) Prior Publication Data

US 2016/0236701 A1 Aug. 18, 2016

Related U.S. Application Data

(60) Provisional application No. 62/117,141, filed on Feb. 17, 2015.

(51) Int. Cl.
*B62B 17/06* (2006.01)
*B62B 13/04* (2006.01)

(52) U.S. Cl.
CPC .......... *B62B 17/065* (2013.01); *B62B 13/046* (2013.01); *B62B 17/061* (2013.01); *B62B 2501/02* (2013.01)

(58) Field of Classification Search
CPC ....... B62B 15/00; B62B 15/002; B62B 17/04; B62B 17/061
See application file for complete search history.

(56) References Cited

U.S. PATENT DOCUMENTS

| 4,773,659 A * | 9/1988 | Rygiel | B62B 13/04 |
| | | | 280/142 |
| 8,177,241 B1 * | 5/2012 | Marks | B62B 13/046 |
| | | | 280/14.28 |
| 2006/0061058 A1 * | 3/2006 | Tange | B62K 21/06 |
| | | | 280/279 |

* cited by examiner

*Primary Examiner* — Erez Gurari
(74) *Attorney, Agent, or Firm* — McCoy Russell LLP (57) ABSTRACT

A board for downhill winter sports forgoes the use of bindings for holding a person in place. An elongated rigid frame receives a foot board on a top portion and a base board on a bottom portion. A steering board allows for a person to direction motion. The elongated rigid frame also receives a rotatable steering column, which is secured through an arm and steering collar. A bearing assembly, including inner race and outer race, allows for rotation of the steering column within the steering collar. The steering column has a control end which includes a first handle and a second handle that serve as a user interface. The steering column also has an actuation end, the actuation end being a fork which is mounted to the steering board. A person can use the handles to rotate the steering column and thus the steering board in order to change direction.

20 Claims, 6 Drawing Sheets

SNOW CAPABLE RECREATIONAL PLATFORM

The current application claims a priority to the U.S. Provisional Patent application Ser. No. 62/117,141 filed on Feb. 17, 2015.

FIELD OF THE INVENTION

The present invention relates generally to a transportation and sporting apparatus. More specifically, the present invention is a downhill, bind-less winter sport board apparatus.

BACKGROUND OF THE INVENTION

The present invention is a downhill, bind-less winter sport board that is equipped with handlebars. The present invention allows riders to move freely on the board while conserving energy by eliminating the need for bindings or straps. The present invention adds significant functionality to winter sporting devices through the provision of a handlebars and double deck (i.e. "board") construction.

The present invention consists of a simple design with quality manufacturing that makes it possible for riders to spend more energy improving in their sport, rather than getting in and out of their gear. The present invention offers durability, control, and functionality that will surely be enjoyed out on the slopes. The present invention is a new and innovative product designed to provide downhill winter sport riders with a new experience, combining elements from Skiing, Snowboarding and BMX.

DETAIL DESCRIPTIONS OF THE INVENTION

All illustrations of the drawings are for the purpose of describing selected versions of the present invention and are not intended to limit the scope of the present invention.

The present invention is a motive apparatus for use in winter environments, especially as related to recreational activities carried out on snow. The present invention comprises an elongated rigid frame 1, a foot board 2, a base board 3, a steering board 4, and a steering column 5. The elongated rigid frame 1 serves to support and integrate the other components of the present invention. The foot board 2 provides a surface for a person to stand on. The base board 3 comes in contact with the ground (e.g. snow) and allows for motion and a degree of steering (as discussed later). The steering board 4, as with the base board 3, comes in contact for the ground and allows for a user to direct movement of the present invention. The steering column 5 serves as an interface that allows a user to manipulate the steering board 4 as desired. Together, these introduced components allow for a user to operate the present invention without the need for bindings. This is in contrast to a number of existing winter equipment, such as skies and snowboards, which require a means of securing a user. The present invention is shown in the accompanying FIG. 1-FIG. 6.

Further describing the aforementioned components of the present invention, the foot board 2 and the base board 3 are both mounted along the elongated rigid frame 1. The elongated rigid frame 1 is positioned between the two boards, such that the foot board 2 is atop the elongated rigid frame 1 while the base board 3 is below the elongated rigid frame 1. The base board 3 is further defined as being pivotally mounted to the elongated rigid frame 1; this allows a user to flex (e.g. tilt) the elongated rigid frame 1 and other connected components relative to the base board 3. This flexible connection provides a finer level of steering than would be achieved with only the steering board 4 and steering mechanism.

As the steering column 5 is provided to allow a user to direct motion of the present invention, the steering column 5 is joined to the steering board 4. The steering column 5 comprises a control end 51 and an actuation end 52; the control end 51 receives direct input from a user (e.g. turning left or turning right) while the actuation end 52 imparts the corresponding input to the steering board 4. The steering board 4 is adjacently connected to the actuation end 52 in order to enable said input. In short, by turning the steering column 5, the steering board 4 is turned a corresponding amount. As the steering board 4 contacts the ground in the same fashion as the base board 3, the steering board 4 is positioned adjacent to the base board 3; the steering board 4 is effectively coplanar with the base board 3. The use of steering board 4 to guide the present invention is similar to the use of a rudder to guide a boat.

The steering column 5 itself is adjacently mounted to the elongated rigid frame 1 at a center section of the steering column 5, i.e. between the steering column's 5 control end 51 and actuation end 52. Additionally, the steering column 5 is rotatably mounted to the elongated rigid frame 1, allowing for the steering column 5 (and connected steering board 4) to be turned relative to the elongated rigid frame 1. The coupling of the steering column 5 and the steering board 4 is facilitated by certain components which are subsequently described.

An arm 6 and a steering collar 7 are provided as part of the mounting of the steering column 5 to the elongated rigid frame 1. The arm 6 is adjacently connected to the elongated frame while the steering collar 7 is adjacently connected to the arm 6. The position of the steering collar 7 is at an end of the arm 6 opposite that of the elongated rigid frame 1. The steering collar 7 is joined to the elongated rigid frame 1 by the steering collar 7, with the steering column 5 axially traversing through the steering collar 7. It is desirable to offset the steering collar 7 from the elongated rigid frame 1 in order to help avoid overlapping of the steering board 4 and the base board 3. If the arm 6 were omitted, the steering column 5 would be positioned much closer to the elongated rigid frame 1; this could hamper user steering and result in the base board 3 interfering with turning of the steering board 4.

Figure 1:
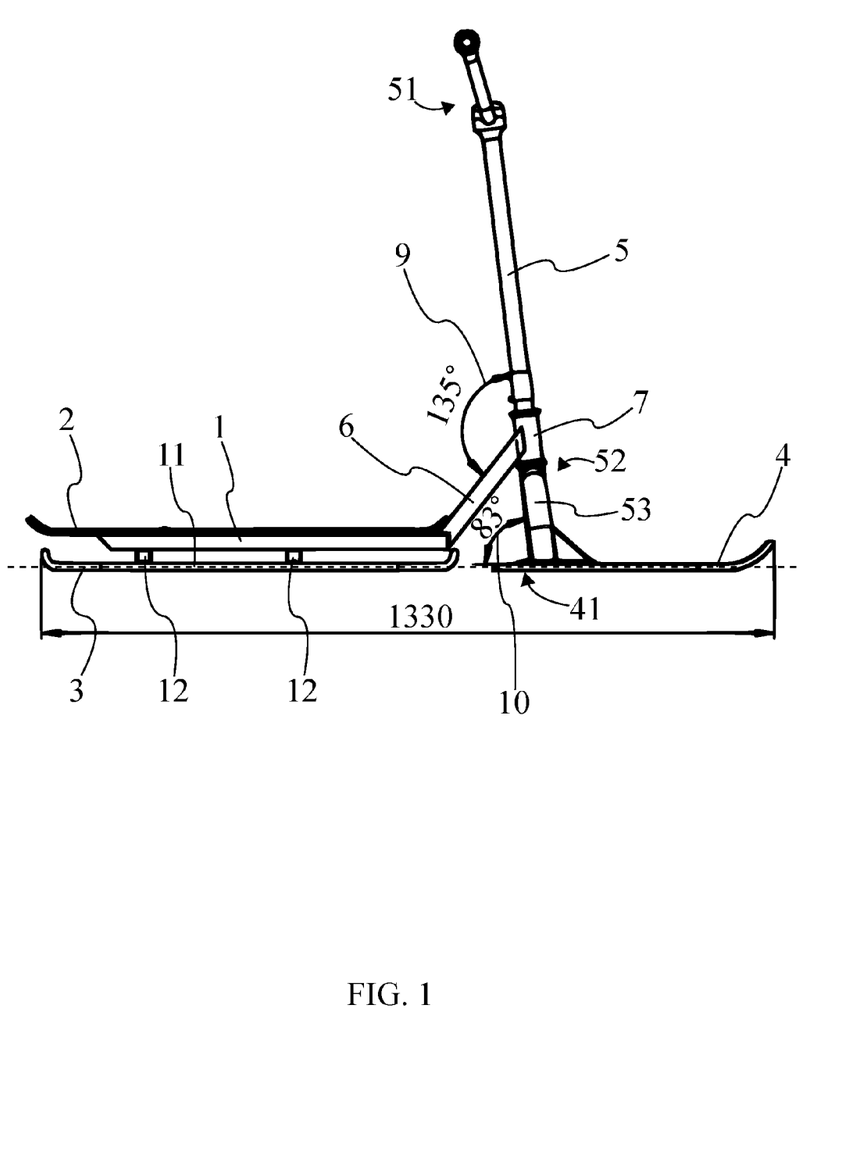
FIG. 1 is a side perspective view drawing of the present invention in a preferred embodiment.
Figure 2:
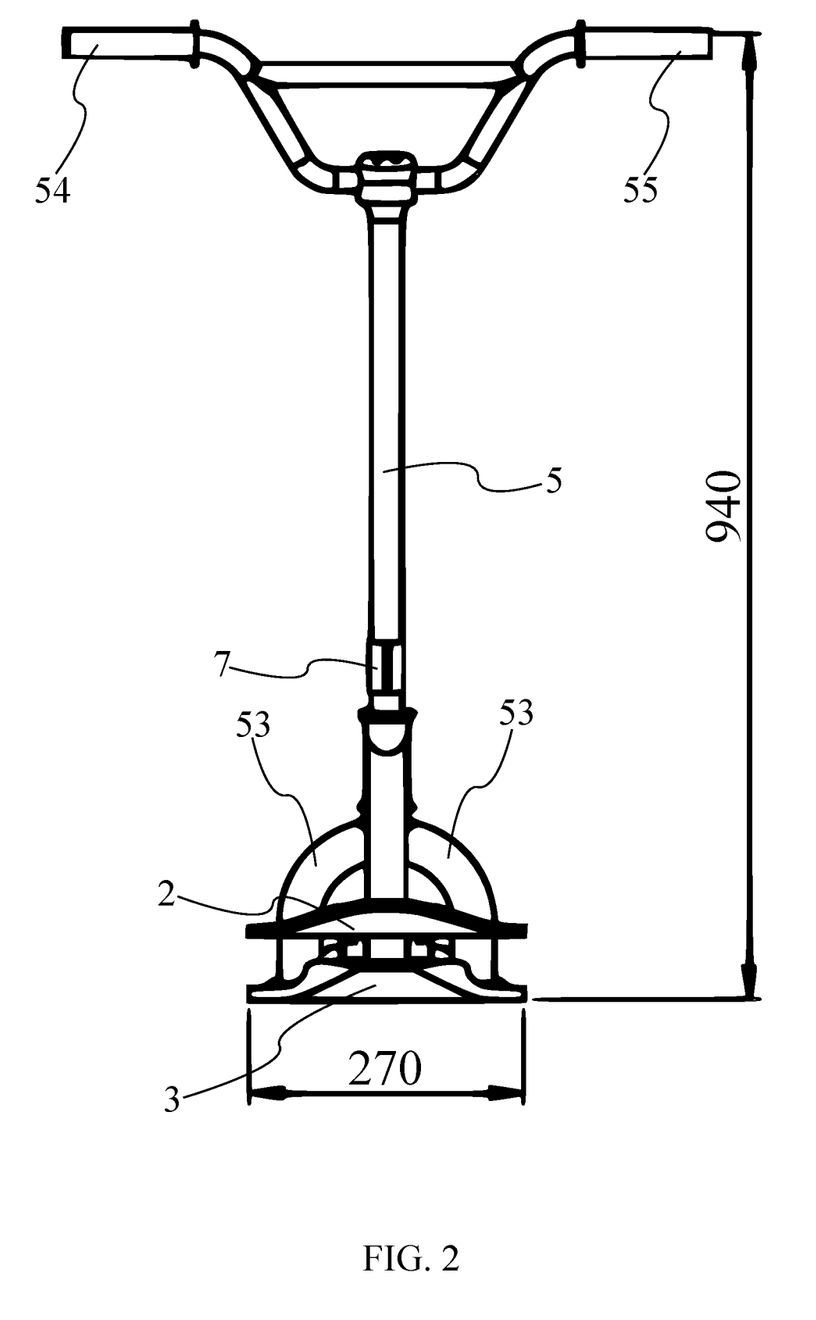
FIG. 2 is a front side perspective view drawing of the present invention in a preferred embodiment.
Figure 3:
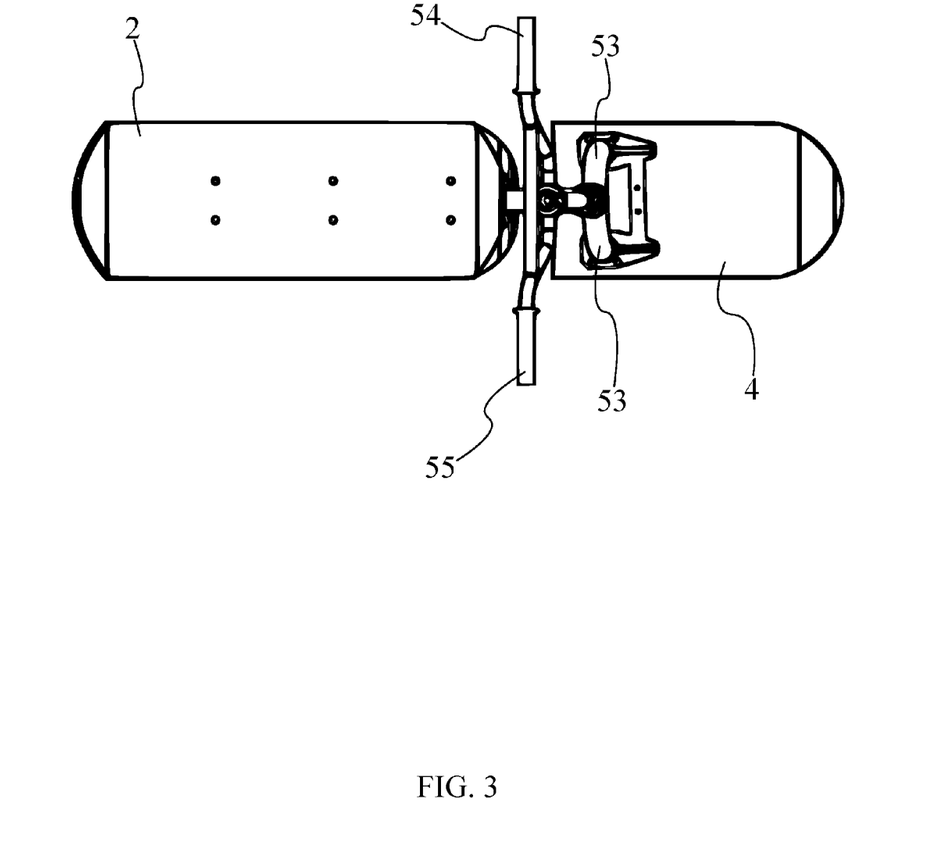
FIG. 3 is a top side perspective view drawing of the present invention in a preferred embodiment.
Figure 4:
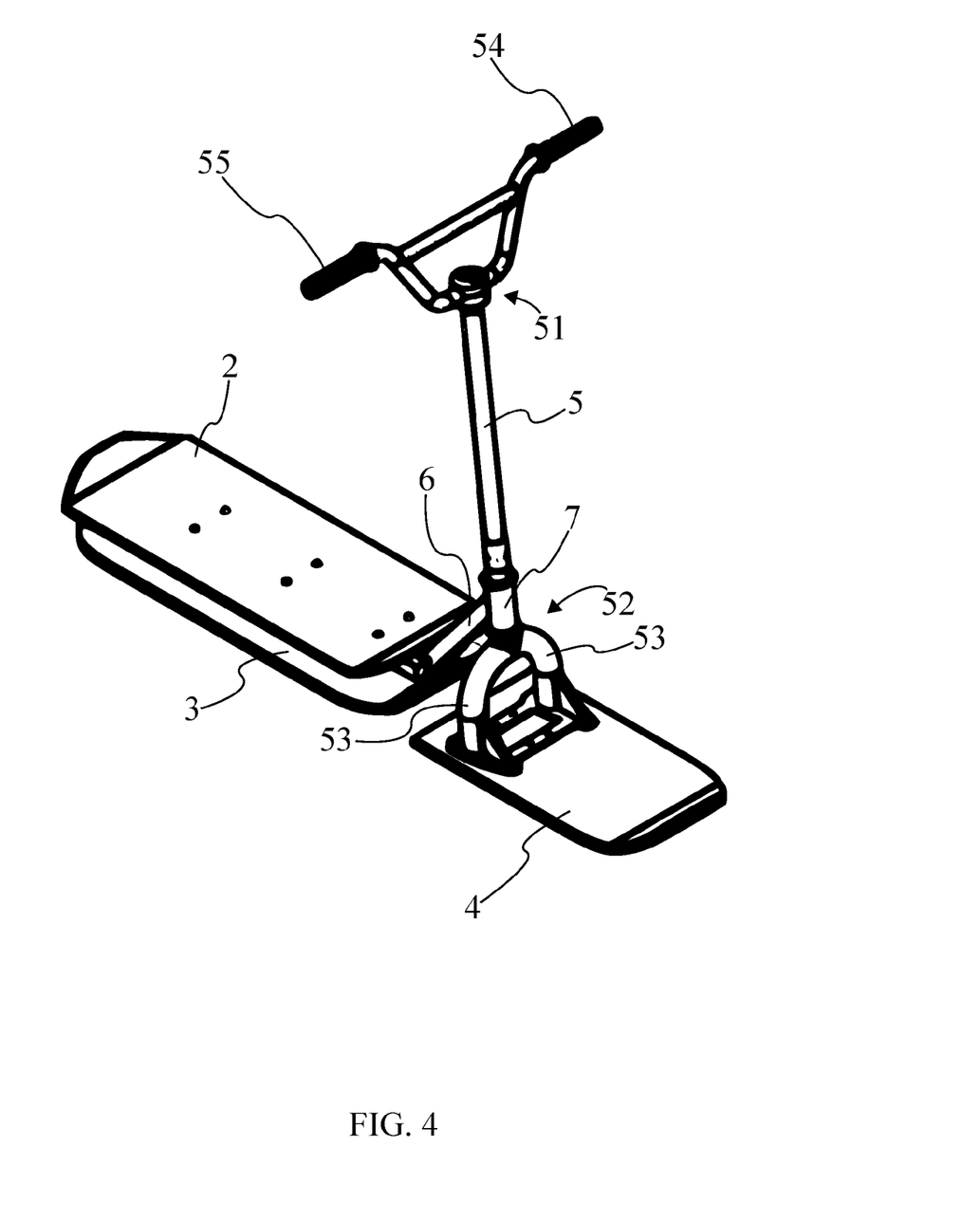
FIG. 4 is a perspective view drawing of the present invention in a preferred embodiment.
Figure 5:
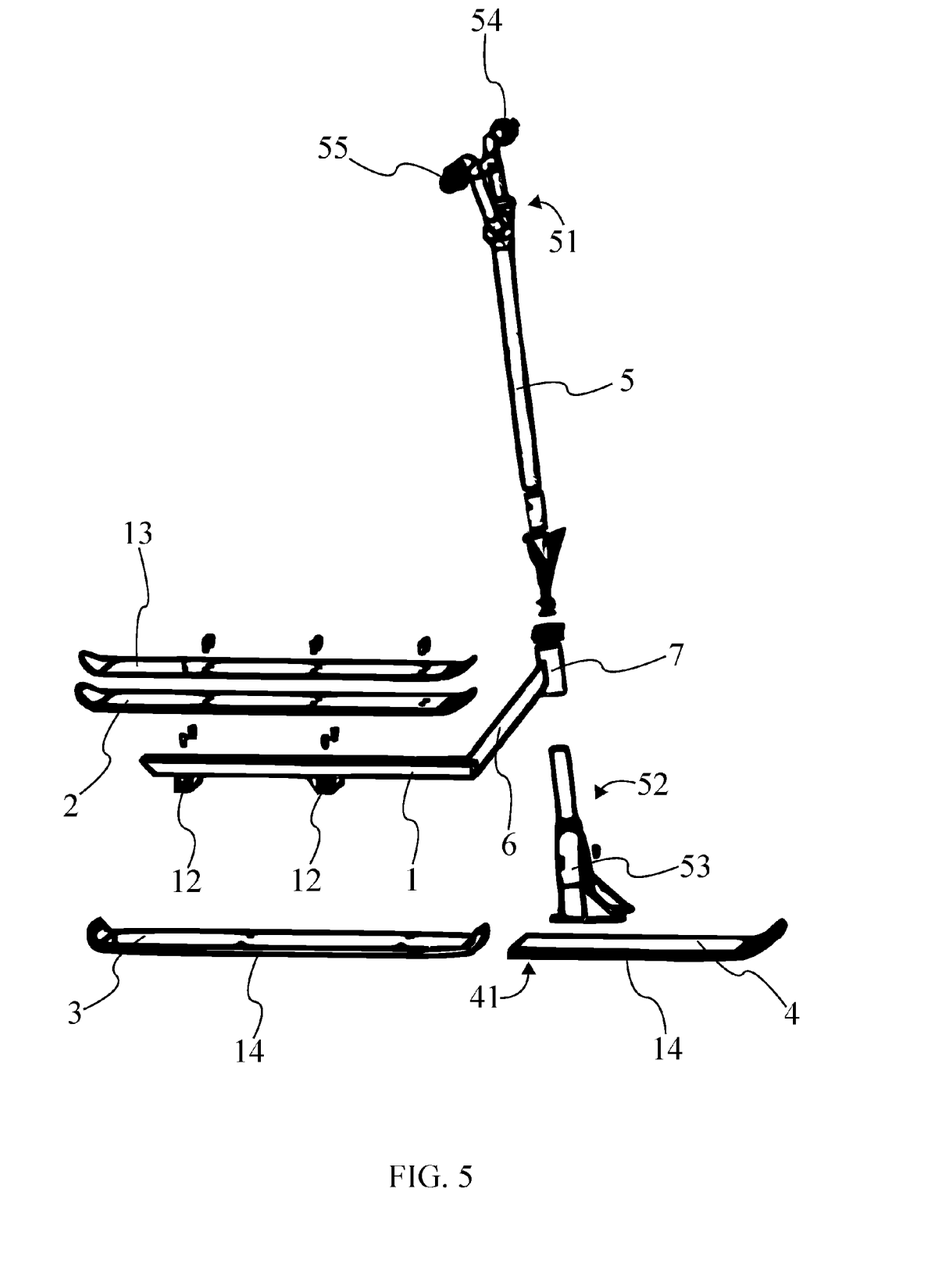
FIG. 5 is a dissected view drawing of the present invention in a preferred embodiment.
Figure 6:
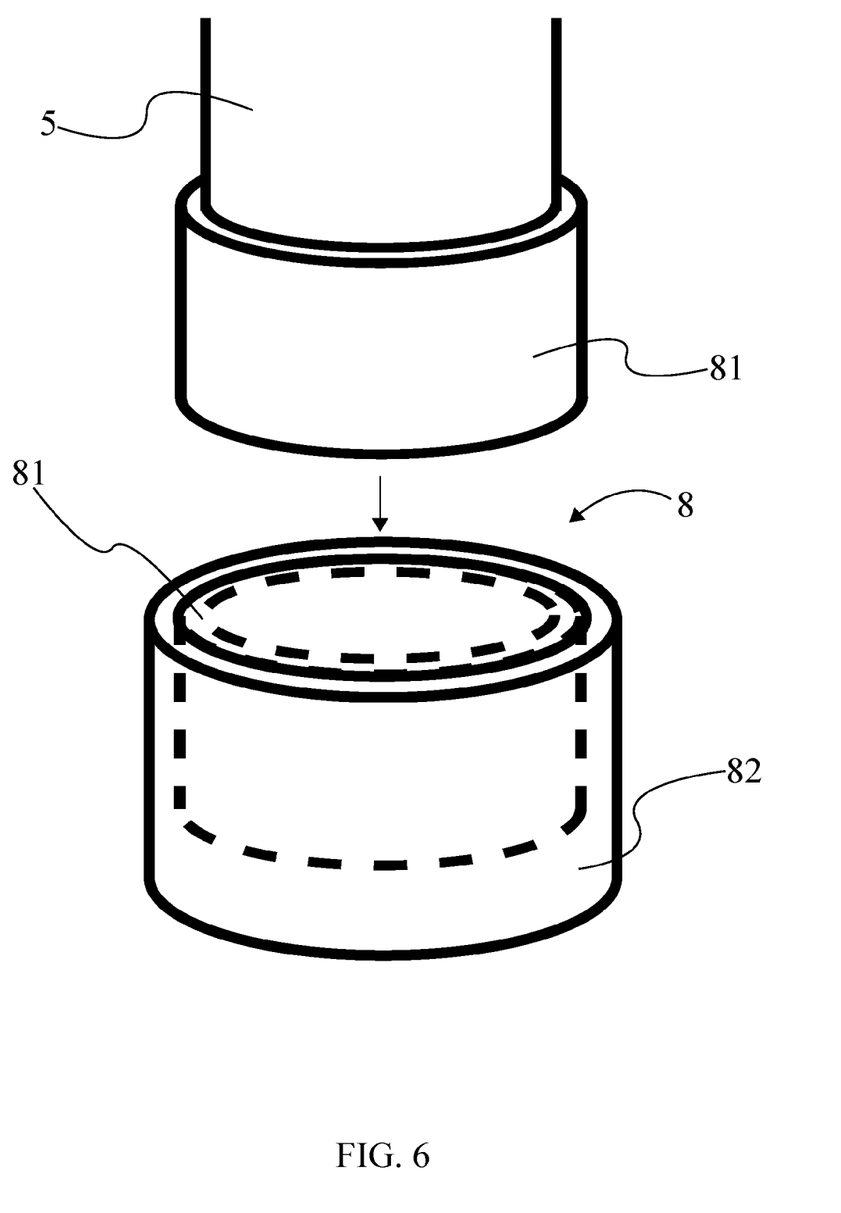
FIG. 6 is a drawing showing a possible bearing of the present invention.

To allow for the steering column 5 to rotate within the steering collar 7, a pivot bearing 8 is provided for the present invention. The pivot bearing 8 comprises an inner race 81 and an outer race 82, which can rotate relative to one another as a result of a low friction mating. This low friction mate is commonly achieved, for example, through the use of ball bearings. The inner race 81 itself is laterally connected around the steering column 5. In a similar fashion, the steering collar 7 is laterally connected around the outer race 82. The inner race 81 is then rotatably mounted within the outer race 82, allowing for the inner race 81 and connected steering column 5 to turn within the outer race 82 and the steering collar 7.

The pivot bearing 8 as described above is just one example of how a rotatable engagement between the steering column 5 and the elongated rigid frame 1 is created. In other embodiments different devices and couplings can be used to mount the steering column 5 to the elongated rigid frame 1 as long as the resulting mount allows for rotation of the steering column 5.

In order to provide an optimized and ergonomic interface for a user, the steering column 5 is oriented at certain angles relative to the other components of the present invention. The first is an obtuse angle 9, which is defined between the steering column 5 and the arm 6. The second is an acute angle, which is defined between a roll axis 11 and the steering column 5. The roll axis 11 itself is defined as traversing through and along the base board 3 and the steering board 4. The obtuse angle 9, between the steering column 5 and the arm 6, is preferably 135°. The acute angle, between the steering column 5 and the roll axis 11, is preferably 83°. These angles have been found to provide the best possible control while moving at slow speeds. While these angles have found to be optimal, other embodiments may utilize different angles between the steering column 5 and arm 6 or between the steering column 5 and the roll axis 11 while remaining within the scope of the present invention.

Further describing the steering column 5, the actuation end 52 is preferably a fork 53 as shown in the illustrated embodiment. The fork 53 is mounted to a proximal end 41 of the steering board 4, i.e. the end of the steering board 4 which is closest to the base board 3. As a result, the steering board 4 has an axis of rotation which is adjacent to the base board 3. This allows the steering board 4 to be places closer to the base board 3, as the movement of the proximal end 41 of the steering board 4 is minimal. This is comparison to a distal end of the steering board 4, which has a greater range of motion.

The interfacing end of the steering column 5, the control end 51, comprises a first handle grip 54 and a second handle grip 55. The first handle grip 54 and the second handle grip 55 are each adjacently connected to the steering column 5, with the first handle grip being positioned left of the steering column 5 and the second handle grip 55 being positioned right of the steering column 5. The first handle grip 54 and the second handle grip 55 are thus positioned opposite each other relative to the steering column 5. Two handle grips are optimal as an individual grip is provided for each of a user's hands.

While the illustrations show the first handle grip 54 and the second handle grip 55 in a vein similar to a bicycle's handlebars, this is just one potential implementation. In other embodiments, facets of the first handle grip 54 and the second handle grip 55 can be altered as deemed desirable by a manufacturer, business, or customers. For example, the angle of the handle grips could be changed, they could be spaced closer or further apart, and so on. Ultimately, any device capable of serving as an interface for a user to direct the steering column 5 can be utilized for the control end 51.

As earlier referenced, the base board 3 is flexible relative to the elongated rigid frame 1. In other words, the base board 3 can be tilted. The ability to tilt the base board 3 allows for a finer level of control and steering then would be provided solely by the steering column 5. The tilting connection allows a user to shift their weight to help control the present invention, in a similar manner to how skateboarders are able to steer using only their feet.

To enable this tilting, a plurality of bushings 12 can be used to join the elongated rigid frame 1 and the base board 3. The bushings 12 are adjacently connected to the elongated frame. The bushings 12 are placed on a bottom of the elongated rigid frame 1, opposite the foot board 2. The plurality of bushings 12 is distributed along the elongated rigid frame 1, their specific positioning affecting how much tilt can be imparted to the base board 3. The base board 3 is tiltably mounted to the elongated frame by these bushings 12; as a result a user can shift their weight to tilt the present invention in a desired direction. This control can be used independently or in conjunction with the steering column 5, according to the whims of the user.

As with the rotatable mounting of the steering column 5 to the elongated rigid frame 1, the specific mounts used to tiltably engage the base board 3 and the elongated rigid frame 1 are not restricted to the bushings 12 as earlier described. As one example of another possible mechanism, springs could be used to create a tiltable mounting of the base board 3 to the elongated rigid frame 1. Other means remain possible within the scope of the present invention.

As the preferred embodiment of the present invention is provided without bindings, it is desirable to provide a foot board 2 which is easy to stand on. Resultantly, a grip-enhancing coating 13 is layered onto the top of the foot board 2, opposite the rigid frame. While a common example of such a grip-enhancing coating 13 is grip tape which is placed on the foot board 2, it is also possible to use sprays, polymers, and further additions to assist a user in maintaining their position on the foot board 2.

Inversely, a low-friction coating 14 is provided for the bottom surfaces of the present invention. The low-friction coatings 14 makes it easier for the present invention to maintain movement over surfaces such as snow. Since both the base board 3 and the steering board 4 contact a ground surface, ideally the low-friction coating 14 is applied to each. As such, the low-friction coating 14 is layered onto the base board 3 opposite the elongated rigid frame 1 and additionally layered onto the steering board 4 opposite the steering column 5. Often utilized with existing winter apparatuses such as snow boards and skis, these coating increase ease of movement across snowy surfaces.

While specific dimensions and materials of the present invention are variable, a potential set of dimensions and materials is provided below as an example. In this example, the base board 3 has a length of between 90 cm and 150 cm along with a width of 270 mm or greater. The steering board 4, in comparison, has a length of between 38 cm and 60 cm. The width of the steering board 4 preferably matches the width of the base board 3, being 270 mm or greater. The base board 3 and the foot board 2 are preferably separate by a gap of 2 in. The top of the steering column 5, i.e. the first handle grip 54 and the second handle grip 55, has a height of 940 mm as measured from the base board 3.

Potential materials which can used for the present invention include 6061 T6 aluminum (for the elongated rigid frame 1) and 4130 chromoloy high carbon steel (for the steering column 5). Further possible materials include 7000 series aluminum, carbon fiber, carbon-carbon, and titanium.

One possible developmental addition for the present invention is the implementation of adjustable heights and angles for the steering column 5, the foot board 2, the base board 3, and the steering board 4. While such additions would require locking mechanisms to secure these components at desired heights and angles, they would add an element of flexibility that allows users to adjust the present invention to their personal preferences. Of course, further developments over the core present invention, as described, are also possible.

Although the invention has been explained in relation to its preferred embodiment, it is to be understood that many other possible modifications and variations can be made without departing from the spirit and scope of the invention as hereinafter claimed.

What is claimed is:

1. A snow capable recreational platform comprising:
   an elongated rigid frame;
   a foot board;
   a base board;
   a steering board;
   a steering column;
   the steering column comprising a control end and an actuation end; the foot board being mounted onto and along the elongated rigid frame;
   the base board being mounted along the elongated rigid frame, opposite to the foot board, the base board joined to the elongated rigid frame via a plurality of bushings at a first location closer to the steering board and a second location further from the steering board; and
   wherein the base board laterally tilts and flexes relative to a longitudinal direction of the elongated rigid frame;
   the steering column being rotatably and adjacently mounted to the elongated rigid frame in between the control end and the actuation end;
   the steering board being adjacently connected to the actuation end; the steering board being adjacently positioned to the base board;
   the steering board comprising a proximal end and a distal end opposite to each other;
   the proximal end being adjacently positioned to the base board; the distal end being remotely positioned to the base board;
   the actuation end being mounted onto the proximal end such that a movement of the proximal end is smaller than a movement of the distal end;
   a grip-enhancing coating; and
   the grip-enhancing coating being layered onto the foot board, opposite to the elongated rigid frame.

2. The snow capable recreational platform as claimed in claim 1 further comprising:
   an arm;
   a steering collar;
   the arm being adjacently connected to the elongated rigid frame;
   the steering collar being adjacently connected to the arm, opposite the elongated rigid frame; and
   the steering column axially traversing through the steering collar.

3. The snow capable recreational platform as claimed in claim 2 further comprising:
   a pivot bearing;
   the pivot bearing comprising an inner race and an outer race; the inner race being laterally connected around the steering column; the inner race being rotatably mounted within the outer race; and
   the steering collar being laterally connected around the outer race.

4. The snow capable recreational platform as claimed in claim 2 further comprising:
   the steering column and the arm being oriented at a fixed obtuse angle to each other.

5. The snow capable recreational platform as claimed in claim 4,
   further comprising the fixed obtuse angle being 135 degrees.

6. The snow capable recreational platform as claimed in claim 1 further comprising:
   a roll axis traversing through and along the base board and the steering board; and
   the steering column and the roll axis being oriented at an acute angle to each other.

7. The snow capable recreational platform as claimed in claim 6,
   further comprising the acute angle being 83 degrees.

8. The snow capable recreational platform as claimed in claim 1 further comprising:
   the actuation end being a fork; and
   the fork being mounted onto the proximal end.

9. The snow capable recreational platform as claimed in claim 1 further comprising:
   the control end comprising a first handle grip and a second handle grip; and
   the first handle grip being adjacently connected to the steering column, and the second handle grip being adjacently connected to the steering column, opposite the first handle grip.

10. The snow capable recreational platform as claimed in claim 1 further comprising:
    the plurality of bushings being adjacently connected to the elongated rigid frame, opposite to the foot board;
    the plurality of bushings being distributed along the elongated rigid frame.

11. The snow capable recreational platform as claimed in claim 1 further comprising:
    the steering board being coplanar with the base board.

12. The snow capable recreational platform as claimed in claim 1 further comprising:
    the grip-enhancing coating being a grip tape, a spray, or a polymer.

13. The snow recreational platform as claimed in claim 11, wherein an end of the steering board closer to the base board has a flat bottom at the end in the co-plane.

14. The snow recreational platform as claimed in claim 2, wherein the base board is coupled with the steering collar at a fixed angle with only rotation relative to the steering column, the steering column coupled at a fixed orientation to the steering board.

15. A snow capable recreational platform comprising:
    an elongated rigid frame;
    a foot board;
    a base board;
    a steering board, the steering board being coplanar with the base board;
    a steering column;
    the steering column comprising a control end and an actuation end; the foot board being mounted onto and along the elongated rigid frame;
    the base board being mounted along the elongated rigid frame, opposite to the foot board, the base board joined to the elongated rigid frame via at least four bushings, at least two laterally offset from each other at a first location closer to the steering board and at least two laterally offset from each other at a second location further from the steering board; and
    wherein the base board laterally tilts and flexes relative to a longitudinal direction of the elongated rigid frame;

the steering column being rotatably and adjacently mounted to the elongated rigid frame in between the control end and the actuation end;

the steering board being adjacently connected to the actuation end; the steering board being adjacently positioned to the base board;

the steering board comprising a proximal end and a distal end opposite to each other;

the proximal end being adjacently positioned to the base board; the distal end being remotely positioned to the base board;

the actuation end being mounted onto the proximal end such that a movement of the proximal end is smaller than a movement of the distal end;

a rigid arm; and a steering collar;

the arm being part of the elongated rigid frame;

the steering collar being adjacently connected to the arm, opposite the elongated rigid frame, the steering column and the arm being oriented at a fixed obtuse angle to each other.

16. The snow recreational platform as claimed in claim 15, wherein an end of the steering board closer to the base board has a flat bottom at the end in the co-plane.

17. The snow recreational platform as claimed in claim 16, wherein the base board is coupled with the steering collar at a fixed angle with only rotation relative to the steering column, the steering column coupled at a fixed orientation to the steering board.

18. The snow recreational platform as claimed in claim 17 further comprising a grip-enhancing coating; and the grip-enhancing coating being layered onto the foot board, opposite to the elongated rigid frame.

19. The snow recreational platform as claimed in claim 15 further comprising handles mounted directly to an end of the steering column.

20. A snow capable recreational platform comprising:

an elongated rigid frame;

a foot board;

a base board;

a steering board, the steering board being coplanar with the base board;

a steering column;

the steering column comprising a control end and an actuation end; the foot board being mounted onto and along the elongated rigid frame;

the base board being mounted along the elongated rigid frame, opposite to the foot board, the foot board being adjacent to the rigid elongated frame, the base board joined to the elongated rigid frame only via a plurality of bushings, including bushings at a first location closer to the steering board and bushings at a second location further from the steering board; and wherein the base board laterally tilts and flexes relative to a longitudinal direction of the elongated rigid frame;

the steering column being rotatably and adjacently mounted to the elongated rigid frame in between the control end and the actuation end;

the steering board being adjacently connected to the actuation end; the steering board being adjacently positioned to the base board;

the steering board comprising a proximal end and a distal end opposite to each other;

the proximal end being adjacently positioned to the base board; the distal end being remotely positioned to the base board;

the actuation end being mounted onto the proximal end such that a movement of the proximal end is smaller than a movement of the distal end;

a rigid arm; and a steering collar;

the arm being part of the elongated rigid frame;

the steering collar being adjacently connected to the arm, opposite the elongated rigid frame, the steering column and the arm being oriented at an obtuse angle to each other.

* * * * *